United States Patent
Zhang et al.

(10) Patent No.: US 9,961,643 B2
(45) Date of Patent: May 1, 2018

(54) METHOD FOR CONTROLLING UPLINK POWER IN MULTI-SUBFRAME SCHEDULING

(71) Applicant: Samsung Electronics Co., Ltd., Gyeonggi-do (KR)

(72) Inventors: Shichang Zhang, Beijing (CN); Yingyang Li, Beijing (CN); Chengjun Sun, Beijing (CN)

(73) Assignee: Samsung Electronics Co., Ltd (KR)

( * ) Notice: Subject to any disclaimer, the term of this patent is extended or adjusted under 35 U.S.C. 154(b) by 488 days.

(21) Appl. No.: 14/252,277

(22) Filed: Apr. 14, 2014

(65) Prior Publication Data
US 2014/0307652 A1    Oct. 16, 2014

(30) Foreign Application Priority Data
Apr. 12, 2013   (CN) .......................... 2013 1 0126249

(51) Int. Cl.
*H04W 52/04* (2009.01)
*H04L 5/00* (2006.01)
(Continued)

(52) U.S. Cl.
CPC .......... *H04W 52/04* (2013.01); *H04L 5/0053* (2013.01); *H04L 5/0055* (2013.01);
(Continued)

(58) Field of Classification Search
None
See application file for complete search history.

(56) References Cited

U.S. PATENT DOCUMENTS

2008/0207247 A1*   8/2008   Gholmieh ............. H04W 52/56
                                                    455/522
2010/0331037 A1   12/2010   Jen
(Continued)

FOREIGN PATENT DOCUMENTS

CN           102577223            7/2012
EP           2 434 818             3/2012

OTHER PUBLICATIONS

3rd Generation Partnership Project; Technical Specification Group Radio Access Network; Evolved Universal Terrestrial Radio Access (E-UTRA).
(Continued)

*Primary Examiner* — Alex Skripnikov
(74) *Attorney, Agent, or Firm* — The Farrell Law Firm, P.C.

(57) ABSTRACT

A method for controlling an uplink (UL) power in a multi-subframe scheduling system is provided. The method includes receiving by a User Equipment (UE), a multi-subframe uplink (UL) scheduling instruction or Physical Downlink Control Channel CHannel (PDCCH) data of a Downlink Control Information (DCI) format 3/3 A of the UE, in a Downlink (DL) subframe where the multi-subframe UL scheduling instruction is transmitted, wherein the multi-subframe UL scheduling instruction or the PDCCH data with DCI format 3/3 A comprises a power controlling command of the PUSCH and determining, by the UE, a transmitting power of the PUSCH of each UL subframe, which is scheduled by the multi-subframe UL scheduling instruction, based on a power controlling command value, and transmitting corresponding PUSCH data based on the transmitting power calculated.

8 Claims, 3 Drawing Sheets

(51) Int. Cl.
  *H04W 52/32* (2009.01)
  *H04L 5/14* (2006.01)
  *H04W 52/14* (2009.01)
  *H04W 52/22* (2009.01)
  *H04W 72/12* (2009.01)

(52) U.S. Cl.
  CPC .............. *H04L 5/0092* (2013.01); *H04L 5/14* (2013.01); *H04W 52/325* (2013.01); *H04W 52/146* (2013.01); *H04W 52/228* (2013.01); *H04W 72/1289* (2013.01); *Y02B 60/50* (2013.01)

(56) References Cited

U.S. PATENT DOCUMENTS

| | | |
|---|---|---|
| 2011/0105050 A1 | 5/2011 | Khandekar et al. |
| 2011/0319120 A1* | 12/2011 | Chen .................. H04W 52/367 455/522 |
| 2012/0087324 A1 | 4/2012 | Kiyoshima et al. |
| 2013/0039286 A1 | 2/2013 | Larsson et al. |
| 2014/0079015 A1* | 3/2014 | Kim ....................... H04W 28/26 370/329 |
| 2015/0156735 A1* | 6/2015 | Goto ....................... H04W 52/54 455/522 |

OTHER PUBLICATIONS

Physical Layer Procedures (Release 11), 3GPP TS 36.213 V11.2.0, Feb. 15, 2013, 173 pages.
China Telecom, "Discussion on Multi-Subframe Scheduling", R1-131137, 3GPP TSG RAN WG1 Meeting #72bis, Apr. 15-19, 2013, 3 pages.
European Search Report dated Sep. 1, 2016 issued in counterpart application No. 14782227.4-1855, 13 pages.
Chinese Office Action dated Mar. 5, 2018 issued in counterpart application No. 201310126249.2, 10 pages.

* cited by examiner

METHOD FOR CONTROLLING UPLINK POWER IN MULTI-SUBFRAME SCHEDULING

This application claims priority under 35 U.S.C. § 119(a) to Chinese Patent Application No. 201310126249.2 which was filed in the State Intellectual Property Office of the People's Republic of China on Apr. 12, 2013, the entire content of each of which is incorporated herein by reference.

BACKGROUND OF THE INVENTION

1. Field of the Invention

The present invention relates generally to power controlling technologies in a communication system, and more particularly, to a method for controlling Uplink (UL) power in a cell using a multi-subframe scheduling.

2. Description of the Related Art

A Long Term Evolution (LTE) system of the $3^{rd}$ Generation Partnership Project (3GPP) standardization organization may support two duplex modes, that is, Frequency-Division Duplexing (FDD) and Time-Division Duplexing (TDD). For the foregoing two modes, length of each radio frame is 10 ms. Each radio frame may consist of 10 subframes, the length of which is 1 ms. The subframe may consist of two consecutive time slots, the length of which is 0.5 ms. That is, a $k^{th}$ subframe includes time slots $2k$ and $(2k+1)$.

For an LTE FDD system, Uplink and Downlink (UL-DL) transmissions may be implemented with two symmetric bands. Thus, at each moment, a UL subframe and a Downlink (DL) subframe may exist simultaneously. For an LTE TDD system, UL-DL transmissions may be implemented with one band, which may be differentiated with time. That is, based on different configurations, different subframes in one system frame may be respectively defined as a UL subframe, a DL subrame, a special subframe (that is, a subframe consisting of a Downlink Pilot Time Slot (DwPTS), a Guard Period (GP) and an Uplink Pilot Time Slot (UpPTS)). The existing LTE TDD system may support 7 kinds of UL-DL configurations, as shown in Table 1. In Table 1, "D" represents a DL subframe, "U" represents a UL subframe, and "S" represents a special subframe.

TABLE 1

LTE TDD UL-DL configurations

| configuration sequence number | conversion point period | subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

In an LTE system, the UL-DL transmission may be implemented with scheduling of an evolved Node B (eNB).

For a DL transmission, an eNB may transmit a DL scheduling command for a certain UE via a Physical Downlink Control CHannel (PDCCH)/an Enhanced PDCCH (EPDCCH) in a DL subframe n. The corresponding UE may receive Physical Downlink Shared CHannel (PDSCH) data in subframe n, based on the DL scheduling instruction of the PDCCH/EPDCCH data. The corresponding UE may also feed back the Acknowledge (ACK)/Negative ACK (HACK) of the PDSCH data via a Physical Uplink Control CHannel (PUCCH) or Physical Uplink Shared CHannel (PUSCH) of an uplink subframe (n+k). For an FDD system, the value of k is always 4. For a TDD system, value of k is dependent on the UL-DL configurations of the TDD, as shown in Table 2.

TABLE 2

Values of k corresponding to different TDD UL-DL configurations

| configuration sequence number | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | — | — | — | 4 | 6 | — | — | — |
| 1 | 7 | 6 | — | — | — | 7 | 6 | — | 4 | 4 |
| 2 | 7 | 6 | — | 4 | 8 | 7 | 6 | — | 4 | 8 |
| 3 | 4 | 11 | — | — | — | 7 | 6 | 6 | 5 | 5 |
| 4 | 12 | 11 | — | — | 8 | 7 | 7 | 6 | 5 | 4 |
| 5 | 12 | 11 | — | 9 | 8 | 7 | 6 | 5 | 4 | 13 |
| 6 | 7 | 7 | — | — | — | 7 | 7 | — | — | 5 |

For the UL transmission, an eNB may transmit a UL scheduling command for a certain UE via a PDCCH/EPDCCH in the DL subframe n. The corresponding UE may transmit PUSCH data in a UL subframe n+$K_{PUSCH}$, based on the UL scheduling instruction in the PDCCH/EPDCCH data. For an FDD system, the value of $K_{PUSCH}$ is always 4. For a TDD system, the value of $K_{PUSCH}$ is dependent on the UL-DL configurations of TDD, as shown in Table 3.

TABLE 3

Values of $K_{PUSCH}$ corresponding to different TDD UL-DL configurations

| configuration sequence number | DL subframe index n | | | | | | | | | |
|---|---|---|---|---|---|---|---|---|---|---|
| | 0 | 1 | 2 | 3 | 4 | 5 | 6 | 7 | 8 | 9 |
| 0 | 4, 7 | 6, 7 | | | | 4, 7 | 6, 7 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

In the existing LTE/LTE-Advanced (LTE-A) system, transmitting power of a UL subframe may be dynamically controlled by an eNB. The eNB may inform a UE about UL power controlling parameters of static and semi-state, by using a broadcast message and a Radio Resource Control (RRC) layer message. In each UL subframe, a UE may determine the transmitting power of the PUSCH, and/or PUCCH of a current subframe, by using these UL power controlling parameters and a power controlling instruction, which was received via the PDCCH/EPDCCH previously.

For example, when PUSCH data and PUCCH data are not transmitted via a same UL subframe, the power of PUSCH of subframe i in current cell c may be determined by using Equation (1).

$$P_{PUSCH,c}(i) = \min \left\{ \begin{array}{c} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{array} \right\} \quad (1)$$

[dBm]

When accumulation is active, $f_c(i)=f_c(i-1)+\delta_{PUSCH,c}(i-K_{PUSCH})$. When the accumulation is inactive, $f_c(i)=$ $\delta_{PUSCH,c}(i-K_{PUSCH})$. $\delta_{PUSCH,c}$ is a power controlling command value, which is in a UL scheduling instruction used for scheduling a UL subframe i, or in a Downlink Control Information (DCI) format 3/3 A of the UE. The specific meanings of other physical parameters may be found by referring to 3GPP protocol 36.213.

The power of PUCCH of subframe i in current cell c may be determined by using Equation (2).

$$P_{PUCCH}(i) = \min \begin{Bmatrix} P_{CMAX,c}(i), \\ P_{O\_PUCCH} + PL_c + h(n_{CQI}, n_{HARQ}, n_{SR}) + \Delta_{F\_PUCCH}(F) + \Delta_{TxD}(F') + g(i) \end{Bmatrix} \quad (2)$$

[dBm]

In Equation (2), $$g(i) = g(i-1) + \sum_{m=0}^{M-1} \delta_{PUCCH}(i - k_m).$$

$\delta_{PUCCH}$ is a power controlling command value, which is in a DL scheduling instruction used for scheduling a DL subframe $i-k_m$, or in the DCI format 3/3 A of the UE. For the FDD system, M=1, $k_0$=4. For the TDD system, the values of M and $k_m$ are as shown in Table 4. The specific meanings of each physical parameter may be found by referring to 3GPP protocol 36.213.

TABLE 4

Indexes {$k_0$, $k_1$, . . . $k_{M-1}$} of a binding relationship between a DL subframe and a UL subframe in a TDD system

| configuration sequence number | subframe number n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Accompanying the increasing data rate requirements put forward by users, in LTE-A, multi-subframe scheduling technologies are becoming more and more focused. In the multi-subframe scheduling, one scheduling instruction may simultaneously schedule multiple DL subframes, or multiple UL subframes. That is, the scheduling instruction and scheduled subframe are no longer in a one to one correspondence. As shown in FIG. 1, by using the multi-subframe scheduling technologies, resource overheads of scheduling instructions may be saved. In addition, since there is no sufficient resource for some special subframes to transmit a UL scheduling command, a UL subframe corresponding to the DL subframe may not be scheduled. The foregoing problem may be well solved, by using the multi-subframe scheduling technologies.

However, a new problem about UL power controlling may be introduced by the multi-subframe scheduling. As mentioned above, based on a definition of the existing standard, the power of PUSCH of a certain UL subframe may be controlled by a power controlling command, which is in a UL scheduling command of a corresponding DL subframe, or is in the DCI format 3/3 A of the UE. The power of PUCCH of a certain UL subframe may be determined by a DL scheduling command, which is in a DL subframe bound with the UL subframe, or may be determined by a scheduling command in the DCI format 3/3A of the UE. However, in the multi-subframe scheduling, the foregoing corresponding relationship may be disorganized. Thus, it is necessary to re-design the power controlling method of the PUSCH and PUCCH, based on the characteristics of the multi-subframe scheduling.

Based on foregoing analysis, it can be seen that a new problem regarding power controlling of PUSCH and PUCCH may be brought about by multi-subframe scheduling. At present, there is no effective method to solve this problem.

SUMMARY OF THE INVENTION

The present invention has been made to address at least the problems and disadvantages described above, and to provide at least the advantages described below. Accordingly, an aspect of the present invention is to provide a method for controlling a UL power in a multi-subframe scheduling system, so as to reasonably control the transmitting power of PUSCH/PUCCH of a UL subframe.

According to an aspect of the present invention, a method for controlling a power of a PUSCH in a multi-subframe scheduling system is provided. The method includes receiving, by a UE, a multi-subframe UL scheduling instruction or PDCCH data of a DCI format 3/3 A of the UE, in a DL subframe where the multi-subframe UL scheduling instruction is transmitted, wherein the multi-subframe UL scheduling instruction or the PDCCH with DCI format 3/3 A includes a power controlling command of the PUSCH; and determining, by the UE, a transmitting power of the PUSCH of each UL subframe, which is scheduled by the multi-subframe UL scheduling instruction, based on a power controlling command value, and transmitting corresponding PUSCH data based on the transmitting power calculated.

According to another aspect of the present invention, a method for controlling a power of a PUCCH in a multi-subframe scheduling system is provided. The method includes receiving, by a UE, a multi-subframe DL scheduling instruction or PDCCH with DCI format 3/3 A of the UE, in a DL subframe where the multi-subframe DL scheduling instruction is transmitted, wherein the multi-subframe DL scheduling instruction or the PDCCH with DCI format 3/3 A carries a power controlling instruction of the PUCCH, which is used for feeding back ACK/NACK information of scheduled DL subframes; and determining, by the UE, a transmitting power of the PUCCH, which corresponds to each DL subframe scheduled by the multi-subframe DL scheduling instruction, and transmitting corresponding PUCCH data based on the transmitting power calculated.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE PRESENT INVENTION

Figure 1:
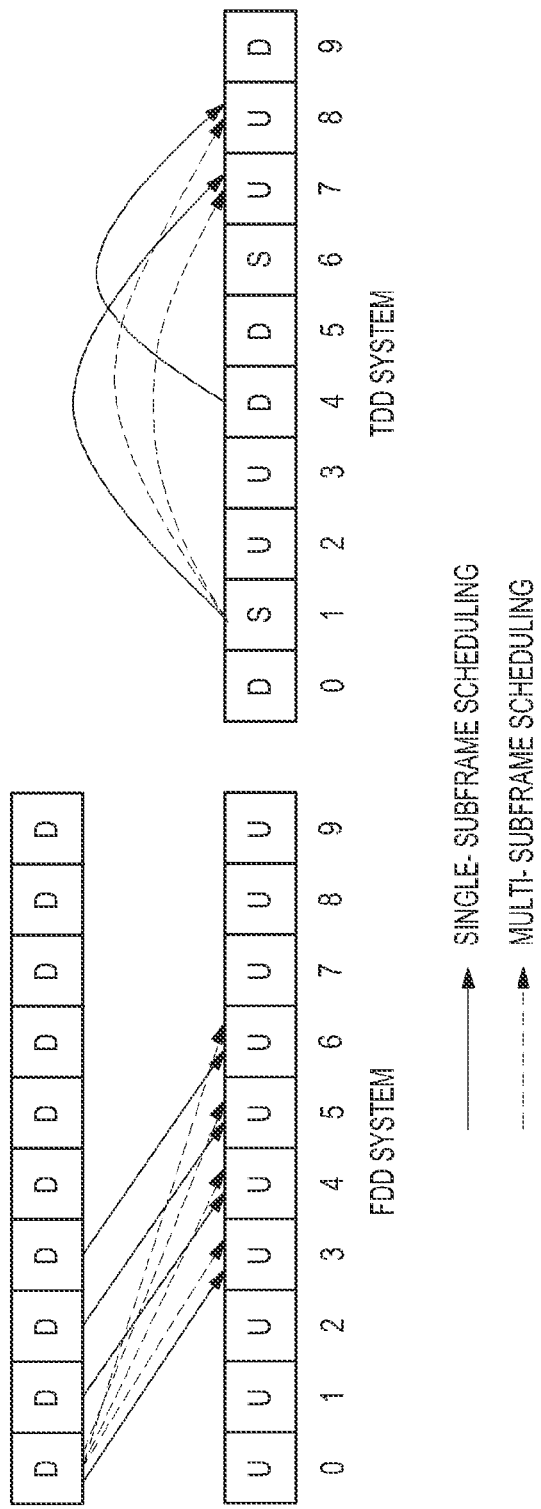
FIG. 1 is a schematic diagram illustrating a single-subframe scheduling and a multi-subframe scheduling.

For simplicity and illustrative purposes, the present invention is described by referring mainly to embodiments thereof. In the following description, numerous specific details are set forth in order to provide a thorough understanding of the present invention. It will be readily apparent however, that the present invention may be practiced without limitation to these specific details. In other instances, some methods and structures have not been described in detail so as not to unnecessarily obscure the present invention. As used throughout the present description, the term "includes" means includes but not limited to, the term "including" means including but not limited to. The term "based on" means based at least in part on. In addition, the terms "a" and "an" are intended to denote at least one of a particular element.

In a multi-subframe scheduling system, since a corresponding relationship between a UL/DL scheduling command and a scheduled UL/DL subframe is changed, the power controlling method for the PUSCH and PUCCH in the existing standard is no longer applicable. To effectively control a UL transmitting power of a UE, it is necessary to re-design a method for controlling a UL power, based on characteristics of a multi-subframe scheduling system.

The basic idea of the present invention is as follows. In a multi-subframe scheduling system, a corresponding relationship for a power controlling instruction of the PUSCH/PUCCH of a UL subframe is reset. Alternatively, in the multi-subframe scheduling, the number of bits in a power controlling field of a scheduling instruction is increased, and a corresponding relationship between a power controlling bit and the PUSCH/PUCCH of a UL subframe is re-defined, so as to guarantee that the PUSCH and PUCCH of any UL subframe may have a corresponding power controlling instruction.

Strictly speaking, examples of the present invention provide 4 kinds of adjustment modes for controlling a power of a UL signal. The 4 kinds of methods for controlling the power of a UL signal may include 2 power controlling methods regarding the PUSCH and 2 power controlling methods regarding the PUCCH, which will be described with reference to the following specific examples. The first and third examples introduce the power controlling method regarding the PUSCH. The second and fourth examples introduce the power controlling method regarding the PUCCH.

First Example

In this example, a multi-subframe UL scheduling instruction and number of power controlling bits in a DCI format 3/3 A of a UE are respectively consistent with definitions in LTE release 11. The effective power controlling about all of the simultaneously scheduled PUSCHs may be implemented in a multi-subframe scheduling, by re-defining a corresponding relationship between a PUSCH and a UL power controlling command, and allocating a power controlling instruction for the PUSCHs of multiple UL subframes, which are simultaneously scheduled in the multi-subframe scheduling.

Figure 2:
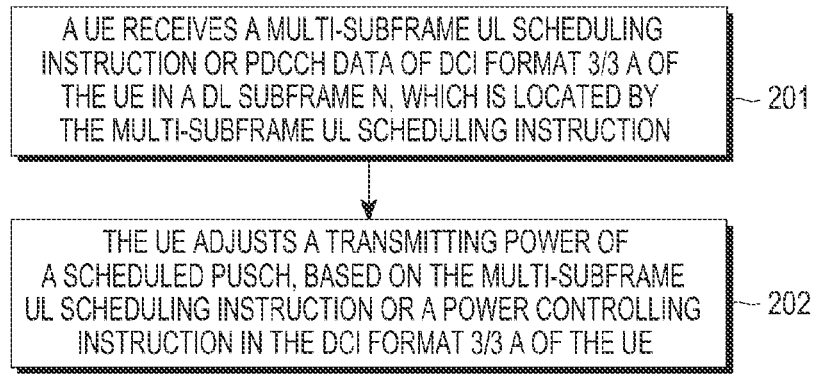
FIG. 2 is a flowchart illustrating a first embodiment of the present invention.

FIG. 2 is a flowchart illustrating a method for controlling a power of a PUSCH, in accordance with the first example of the present invention.

In step 201, a UE receives a multi-subframe UL scheduling instruction, or PDCCH data in the DCI format 3/3 A of the UE, in a DL subframe n located by the multi-subframe UL scheduling instruction.

The position of the DL subframe, which is located by the multi-subframe UL scheduling instruction, may be defined in advance by the standard, or may be indicated by high-level or physical layer signaling. The effective range of a scheduling instruction is V UL subframes. Positions of the V UL subframes may be defined in advance by the standard, or indicated by high-level or physical layer signaling. The number N of UL subframes, which are actually scheduled by the scheduling instruction, may be less than or equal to V. That is, the scheduling instruction may schedule some UL subframes of the V UL subframes. At this time, positions of the N UL subframes, which are actually scheduled, may be indicated by bit information in the scheduling instruction or other physical layer signaling.

The effective range of the power controlling command, which is included in the UL scheduling instruction and the PDCCH of the DCI format 3/3 A, may be the foregoing V UL subframes. At this time, a subframe interval between a DL subframe and a UL subframe is a set $\{r_0, r_1, \ldots r_{V-1}\}$, in which the DL subframe is the one where the UL scheduling instruction or the DCI format 3/3 A is transmitted. Alternatively, the effective range of the power controlling command, which is included in the UL scheduling instruction and the PDCCH of the DCI format 3/3A, may be the N UL subframes, which are actually scheduled. At this time, the subframe interval between the DL subframe and a UL subframe is a set $\{r_0, r_1, \ldots r_{N-1}\}$, in which the DL subframe is the one where the UL scheduling instruction or the DCI format 3/3 A is transmitted.

At this time, the number of power controlling bits included in the multi-subframe UL scheduling instruction and the DCI format 3 for the UE, is still 2. The number of power controlling bits in the DCI format 3A is 1.

In step 202, the UE determines the transmitting power of the scheduled PUSCH, based on the power controlling command in the multi-subframe UL scheduling instruction or in the DCI format 3/3A of the UE.

In this example, regarding the power controlling instruction A, which is included in the multi-subframe UL scheduling instruction or in the DCI format 3/3 A of the UE, when transmitting multiple UL subframes, which are scheduled by the multi-subframe UL scheduling instruction, the transmitting power of PUSCH may be determined by the first scheduled UL subframe based on the power controlling instruction A in the prior art. The PUSCH power of another scheduled UL subframes is the same as the last PUSCH power of the same UL subframe.

Specifically, the transmitting power of the PUSCH in a UL subframe u may be determined by Equation (3).

$$P_{PUSCH,c}(u) = \min \left\{ \begin{array}{c} P_{CMAX,c}(u), \\ 10\log_{10}(M_{PUSCH,c}(u)) + P_{O\_PUSCH,c}(j) + \alpha_c(j) \cdot PL_c + \Delta_{TF,c}(u) + f_c(u) \end{array} \right\} \quad (3)$$

[dBm]

In Equation (3), $P_{PUSCH,c}(u)$ represents the transmitting power of the PUSCH in a UL subframe u of serving cell c of the UE. $P_{CMAX},c(u)$ represents the maximum transmitting power in UL subframe u of serving cell c of the UE. $M_{PUSCH},c(u)$ represents number of Physical Resource Blocks (PRBs), which are scheduled for the UE by an eNB in the UL subframe u of serving cell c, by using the multi-subframe UL scheduling command. $P_{O\_PUSCH},c(j)$ represents an open-loop basic operating point of the PUSCH in the serving cell c of the UE, which may be configured by the eNB with high-level signaling, and the value of j may be dependent on the scheduling mode of the PUSCH. $\alpha_c(j)$ represents a path loss compensation coefficient, $PL_c$ represents a path loss, and $\Delta_{TF,c}(u)$ represents a power compensation for a controlling bit, which is transmitted within the PUSCH, such as a Channel Quality Indicator (CQI). $f_c(u)$ represents a closed-loop power adjustment factor of the PUSCH.

Based on the definition of the effective range of the power controlling command in step 201, under the circumstances that the effective range of the power controlling command is the foregoing V UL subframes, and the accumulation is active, when $u=n+r_0$, $f_c(u)=f_c(u-1)+\delta_{PUSCH,c}(u-r_0)$. When $n+r_0<u\leq n+r_{V-1}$, $f_c(u)=f_c(u-1)$. $\delta_{PUSCH,c}(u-r_0)$ is a power controlling command value, which is in a UL scheduling instruction of a DL subframe $u-r_0$, or in the DCI format 3/3 A of the UE. Under the circumstances that the accumulation is inactive, when $u=n+r_0$, $f_c(u)=\delta_{PUSCH,c}(u-r_0)$. When $n+r_0<u\leq n+r_{V-1}$, $f_c(u)=f_c(u-1)$. $\delta_{PUSCH,c}(u-r_0)$ represents a power controlling command value in the UL scheduling instruction or in the DCI format 3.

Under the circumstances that the effective range of the power controlling command is the foregoing N UL subframes, when the accumulation is active and $u=n+r_0$, $f_c(u)=f_c(u-1)+\delta_{PUSCH,c}(u-r_0)$. When $n+r_0<u\leq n+r_{V-1}$, $f_c(u)=f_c(u-1)$. $\delta_{PUSCH,c}(u-r_0)$ represents a power controlling command value in the UL scheduling instruction of a DL subframe $u-r_0$, or in the DCI format 3/3 A of the UE. Under the circumstances that the accumulation is inactive, when $u=n+r_0$, $f_c(u)=\delta_{PUSCH,c}(u-r_0)$. When $n+r_0<u\leq n+r_{V-1}$, $f_c(u)=f_c(u-1)$. $\delta_{PUSCH,c}(u-r_0)$ represents a power controlling command value in the UL scheduling instruction or in the DCI format 3.

When the PDCCH data in the UL scheduling command and the DCI format 3/3 A simultaneously occur in one subframe, the power controlling command in the DL scheduling command is employed.

At this point, the method for controlling the UL power in the above example may be terminated. When the effective ranges of multiple scheduling instructions (multi-subframe scheduling instruction or single-subframe scheduling instruction) includes a UL subframe u, the UL subframe u may adjust the transmitting power of the PUSCH, based on the power controlling command in the last UL scheduling instruction and the effective range r of the power controlling command.

Second Example

In this example, the number of power controlling bits, which are in a multi-subframe DL scheduling instruction and DCI format 3/3 A of the UE, is consistent with the definition in LTE release 11. A power controlling instruction may be allocated for the feedback of the PUCCH in the multi-subframe DL scheduling, by re-defining a corresponding relationship between the PUCCH and the UL power controlling command.

Figure 3:
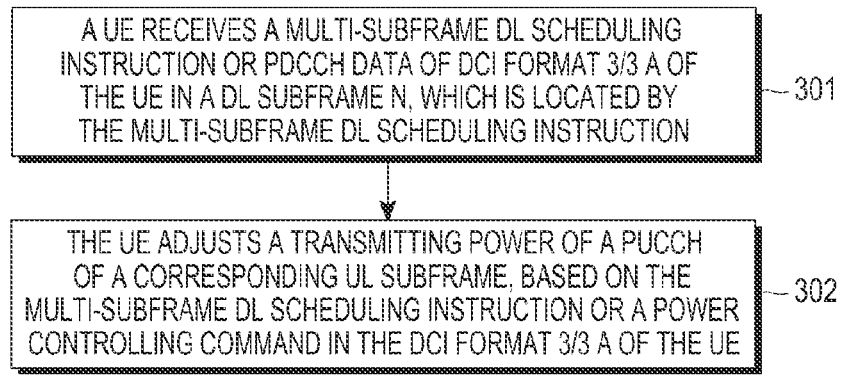
FIG. 3 is a flowchart illustrating a second embodiment of the present invention.

FIG. 3 is a flowchart illustrating a method for controlling a PUCCH power, in accordance with the second example of the present invention.

In step 301, a UE receives PDCCH data, which is about a multi-frame DL scheduling instruction or the DCI format 3/3 A of the UE, in a DL subframe n located by the multi-subframe DL scheduling instruction.

The position of the DL subframe, which is located by the multi-subframe DL scheduling instruction may be defined by the standard in advance, or may be indicated by high-level or physical layer signaling. The effective range of a scheduling instruction may be V DL subframes. Positions of the V DL subframes may be defined by the standard in advance, or may be indicated by high-level or physical layer signaling. The number N of DL subframes, which are actually scheduled by the scheduling instruction, may be less than or equal to V. That is, the scheduling instruction may schedule some DL subframes of the V DL subframes. At this time, positions of the N DL subframes actually scheduled may be indicated by bit information in the scheduling instruction, or in another physical layer signaling.

The effective range of the power controlling command, which is included in the DL scheduling instruction and in the PDCCH of DCI format 3/3 A, may be the foregoing V DL subframes. At this time, a subframe interval between a DL subframe and V DL subframes is a set r: $\{r_0, r_1, \ldots r_{V-1}\}$. The DL subframe is the one where DL scheduling instruction or the DCI format 3/3 A is transmitted. Alternatively, the effective range of the power controlling command, which is included in the DL scheduling instruction and in the PDCCH of the DCI format 3/3 A, may be the N DL subframes actually scheduled. At this time, the subframe interval between the DL subframe and the N DL subframes is a set r: $\{r_0, r_1, \ldots r_{N-1}\}$.

At this time, number of power controlling bits for the UE, which are in the multi-subframe DL scheduling instruction and DCI format 3, is still 2. The number of power controlling bits in the DCI format 3A is 1.

In step 302, the UE determines the transmitting power of the PUCCH of a corresponding UL subframe, based on a power controlling command in the multi-subframe DL scheduling instruction or in the DCI format 3/3 A of the UE.

The transmitting power of the PUCCH of a UL subframe u may be determined by using Equation (4).

$$P_{PUCCH}(u) = \min \left\{ \begin{array}{l} P_{CMAX,c}(u), \\ P_{O\_PUCCH} + PL_c + h(n_{CQI}, n_{HARQ}, n_{SR}) + \Delta_{F\_PUCCH}(F) + \Delta_{TxD}(F') + g(u) \end{array} \right\} \quad (4)$$

[dBm]

In Equation (4), $P_{PUCCH}$ represents the transmitting power of the PUCCH in a UL subframe u of the UE. $P_{CMAX},c(u)$ represents the maximum transmitting power in the UL subframe u of serving cell c of the UE. $h(n_{CQI}, n_{HARQ}, n_{SR})$ is dependent on the format of the PUCCH, which is a function value determined by the current PUCCH format, as well as a bit number of CQI, Hybrid Automatic Repeat reQuest (HARQ) and Scheduling Request (SR) included in the current PUCCH. $P_{O\_PUCCH}$ is an open-loop basic operating point of the PUCCH of the UE, which may be configured by an eNB with high-level signaling. $PL_c$ represents a path loss. $\Delta_{F\_PUCCH}(F)$ represents a power adjustment factor for different PUCCH formats, in which F represents a different PUCCH format. $\Delta_{T \times D}(F)$ represents a power adjustment factor for different PUCCH formats, when the PUCCH uses space to obtain diversity, in which F represents a different PUCCH format. g(u) represents a closed-loop power adjustment factor of the PUCCH. The specific meaning of each foregoing parameter may be found by referring to 3GPP protocol 36.213.

For an FDD system, when one UL subframe only feeds back the ACK/NACK information of one DL subframe, regarding the power controlling instruction A in the multi-subframe DL scheduling instruction or in the DCI format 3/3 A of the UE, when executing the PUCCH transmission corresponding to multiple DL subframes scheduled by the multi-subframe DL scheduling instruction, for the PUCCH corresponding to the first scheduled DL subframe, the transmitting power of the PUCCH may be determined based on the power controlling instruction A in the prior art. The transmitting power of a PUCCH corresponding to another scheduled DL subframe may be the same as the previous transmitting power of the PUCCH.

Specifically, when $u=n+r_0+k=n+r_0+4$, $g(u)=g(u-1)+\delta_{PUCCH}(n)$. $\delta_{PUCCH}(n)$ represents a power controlling command value in the multi-subframe DL scheduling instruction, or in the DCI format 3/3 A of the UE in subframe n. Based on the definition of the effective range of power controlling command provided in step 301, $(n+r_0)$ may represent a first DL subframe of the foregoing V DL subframes, or represent the first DL subframe of the foregoing N DL subframes actually scheduled. When $n+r_0+4 < u \leq n+r_{V-1}+4$ (when the effective range of the power controlling command is V UL subframes) or $n+r_0+4 < u \leq n+r_{N-1}+4$ (when the effective range of the power controlling command is N UL subframes), $g(u)=g(u-1)$.

For an FDD system, when one UL subframe u feeds back the ACK/NACK information of multiple DL subframes, or, for a TDD system, regarding all of the M (for the FDD system, the value of M may be re-defined by the standard, the value of M corresponding to the TDD system may be re-defined by the standard or use the M value shown in Table 4) DL subframes fed back by the UL subframe u, the multi-subframe scheduling instruction used for scheduling these DL subframes is determined, and DL subframes $m_0, \ldots, m_{T-1}$ located by the PDCCH data in DCI format 3/3 A of the UE in the M DL subframes. The sum of the power controlling command values carried by the DL subframes $m_0, \ldots, m_{T-1}$ is calculated to obtain an intermediate result, and the result of $g(u-1)$ is added to the intermediate result to obtain $g(u)$.

Specifically, $$g(u) = g(u-1) + \sum_{t=0}^{t \leq T-1} \delta_{PUCCH}(m_t).$$

T represents number of subframes, which include the multi-subframe DL scheduling instruction or the PDCCH data of DCI format 3/3 A of the UE, of the M DL subframes bound with the UL subframe u. $\delta_{PUCCH}(m_t)$ represents a power controlling command value in the multi-subframe DL scheduling instruction of subframe $m_t$, or in the DCI format 3/3 A of the UE in subframe $m_t$. When the PDCCH data of the DL scheduling command and the DCI format 3/3 A simultaneously occur in one subframe, only the power controlling command of the DL scheduling command is employed.

At this point, the method for controlling the UL power in the example may be terminated.

Third Example

In this example, the effective power controlling of all of the simultaneously scheduled PUSCHs in a multi-subframe scheduling may be implemented, by increasing number of power controlling bits within a multi-subframe UL power controlling command, and matching different power controlling bits to the PUSCHs of multiple UL subframes simultaneously scheduled.

Figure 4:
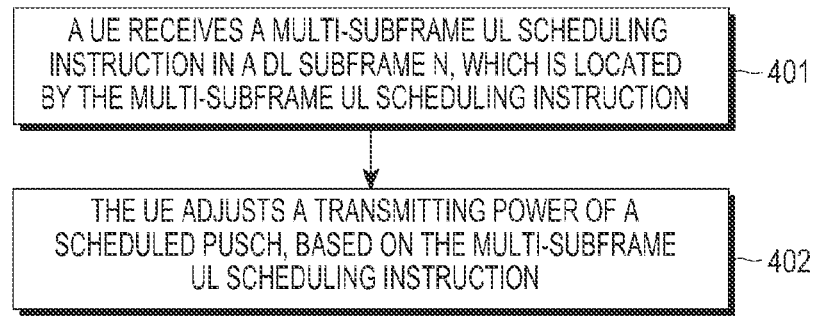
FIG. 4 is a flowchart illustrating a third embodiment of the present invention.

FIG. 4 is a flowchart illustrating a method for controlling PUSCH power, in accordance with a third example of the present invention.

In step 401, a UE receives a multi-subframe UL scheduling instruction in a DL subframe n, which is located by the multi-subframe UL scheduling instruction.

The position of the DL subframe, which is located by the multi-subframe UL scheduling instruction, may be defined in advance by the standard, or may be indicated by high-level or physical layer signaling. The effective range of the scheduling instruction may be V UL subframes. Positions of the V UL subframes may be defined by the standard in advance, or may be indicated by high-level or physical layer signaling. The number N of UL subframes actually scheduled by the scheduling instruction may be less than or equal to V. That is, the scheduling instruction may schedule some UL subframes of the V UL subframes. At this time, positions of the N UL subframes actually scheduled may be indicated by bit information in the scheduling information, or within another physical layer signaling.

The effective range of the power controlling command in the UL scheduling instruction, and within the PDCCH data of the DCI format 3/3 A may be the foregoing V UL subframes. At this time, a subframe interval between a DL subframe and a UL subframe may be a set r: $\{r_0, r_1, \ldots r_{V-1}\}$, in which the DL subframe is the one where the UL scheduling instruction or the DCI format 3/3 A is transmitted. The effective ranges of the power controlling command in the UL scheduling instruction and within the PDCCH data of the DCI format 3/3 A may be the N UL subframes actually scheduled. At this time, the subframe interval between the DL subframe and a UL subframe is a set r: $\{r_0, r_1, \ldots r_{N-1}\}$, in which the DL subframe is the one where the UL scheduling instruction or the DCI format 3/3 A is transmitted. At this time, based on the effective range of the power controlling instruction, the number of power controlling bits in the multi-subframe UL scheduling instruction is 2V or 2N.

In step 402, the UE adjusts the transmitting power of the scheduled PUSCH, based on the multi-subframe UL scheduling instruction.

The transmitting power of the PUSCH in a UL subframe $(n+r)$ may be determined by Equation (5), in which $r_i \in \{r_0, r_1, \ldots r_{V-1}\}$ or $\{r_0, r_1, \ldots r_{N-1}\}$.

$$P_{PUSCH,c}(n+r_i) = \min\left\{\begin{array}{l} P_{CMAX,c}(n+r_i), \\ 10\log_{10}(M_{PUSCH,c}(n+r_i)) + P_{O\_PUSCH,c}(j) + \alpha_c(j) \cdot PL_c + \Delta_{TF,c}(n+r_i) + f_c(n+r_i) \end{array}\right\} [\text{dBm}] \quad (5)$$

The meaning of each parameter in the above formula is the same as that in the first example.

When the accumulation is active, $f_c(n+r_i)=f_c(n+r_i-1)+\delta_{PUSCH,c}(n_i)$. $\delta_{PUSCH,c}(n_i)$ represents a power controlling command value indicated by power controlling bits $2i$, $2i+1$ in the UL scheduling instruction. When the accumulation is inactive, $f_c(n+r_0)=\delta_{PUSCH,c}(n_i)$. $\delta_{PUSCH,c}(n_i)$ represents the power controlling command value indicated by power controlling bits $2i$, $2i+1$, which are in the UL scheduling instruction or in the DCI format 3.

At this point, the method for controlling the UL power in the example may be terminated. When each of the effective ranges of multiple scheduling instructions (multi-subframe scheduling instruction or single-subframe scheduling instruction) includes the UL subframe u, the UL subframe u may adjust the transmitting power of PUSCH, based on the power controlling command in the previous UL scheduling instruction and the effective range r of the foregoing power controlling command.

Fourth Example

In this example, a power controlling instruction is allocated for the feedback of the PUCCH in a multi-subframe DL scheduling, by increasing number of power controlling bits in a multi-subframe DL scheduling instruction, and respectively matching different power controlling bits with PUCCHs, which correspond to the multiple DL subframes simultaneously scheduled.

Figure 5:
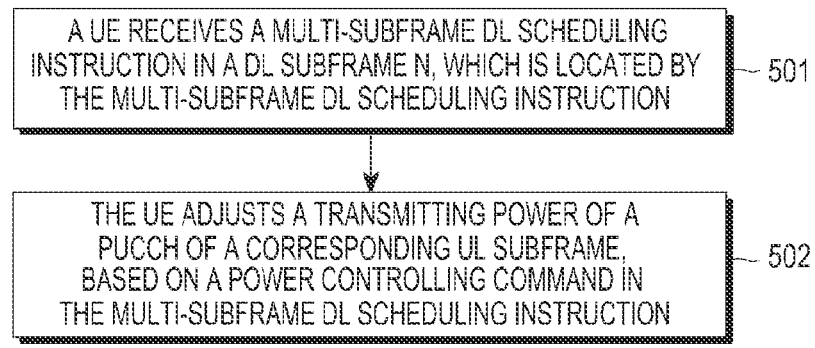
FIG. 5 is a flowchart illustrating a fourth embodiment of the present invention.

FIG. 5 is a flowchart illustrating a method for controlling PUCCH power, in accordance with a fourth example of the present invention.

In step 501, a UE receives a multi-subframe DL scheduling instruction in a DL subframe n, which is located by the multi-subframe DL scheduling instruction.

The position of the DL subframe, which is located by the multi-subframe DL scheduling instruction, may be defined by the standard in advance, or may be indicated by high-level or physical layer signaling. The effective range of the scheduling instruction may be V DL subframes. Positions of the V DL subframes may be defined by the standard in advance, or may be indicated by high-level or physical layer signaling. The number N of DL subframes actually scheduled by the scheduling instruction may be less than or equal to V. That is, the scheduling instruction may schedule some DL subframes of the V DL subframes. At this time, positions of the N DL subframes actually scheduled may be indicated by bit information in the scheduling instruction, or within another physical layer signaling.

The effective range of a power controlling command, which is included in a DL scheduling instruction and the PDCCH data of the DCI format 3/3 A, may be the foregoing V DL subframes. At this time, a subframe interval between a DL subframe and V DL subframes is a set r: $\{r_0, r_1, \ldots r_{V-1}\}$, in which the DL subframe is the one where the DL scheduling instruction or the DCI format 3/3 A is transmitted. The effective range of the power controlling command, which is included in the DL scheduling instruction and the PDCCH data of the DCI format 3/3 A, may be the N DL subframes actually scheduled. At this time, the subframe interval between the DL subframe and N DL subframes is a set r: $\{r_0, r_1, \ldots r_{N-1}\}$, in which the DL subframe is the one where the DL scheduling instruction or the DCI format 3/3 A is transmitted. At this time, based on the effective range of the power controlling instruction, the number of power controlling bits in the multi-subframe DL scheduling instruction is 2V or 2N. Power controlling bits $2i$ and $2i+1$ may correspond to the DL subframes $n+r_i$.

In step 502, the UE adjusts the transmitting power of the PUCCH of a corresponding UL subframe, based on the power controlling command in the multi-subframe DL scheduling instruction.

The transmitting power of the PUCCH of a UL subframe u may be determined by Equation (6).

$$P_{PUCCH}(u) = \min \left\{ \begin{array}{l} P_{CMAX,c}(u), \\ P_{0\_PUCCH} + PL_c + h(n_{CQI}, n_{HARQ}, n_{SR}) + \Delta_{F\_PUCCH}(F) + \Delta_{TxD}(F') + g(u) \end{array} \right\} \quad (6)$$

[dBm]

The meaning of each parameter in the above formula is the same as that in the second example.

For an FDD system, under the circumstances that one UL subframe only feeds back the ACK/NACK information of one DL subframe, when $u=n+r_i+4$, $g(u)=g(u-1)+\delta_{PUCCH}(n+r_i)$. $\delta_{PUCCH}(n+r_i)$ represents a power controlling command value corresponding to subframe $n+r_i$ in the multi-subframe DL scheduling instruction.

For an FDD system, when one UL subframe only feeds back the ACK/NACK information of multiple DL subframes, or for a TDD system, $$g(u) = g(u-1) + \sum_{r=0}^{r \leq M-1} \delta_{PUCCH}(u - k_m).$$

$\delta_{PUCCH}(u-k_m)$ represents a power controlling command value corresponding to subframe $u-k_m$ in the multi-subframe DL scheduling instruction. M represents the number of DL subframes bound with the UL subframe u. For an FDD system, value of M may be re-defined by the standard. For a TDD system, value of M may be re-defined by the standard or is as shown in Table 4.

At this point, the method for controlling the UL power in the example may be terminated. As mentioned above, a UE may adjust the size of an open-loop basic operating point of conflicted UL subframes, by enabling an eNB to transmit a specific parameter about the open-loop basic operating point of a UE of the conflicted UL subframes. Subsequently, power controlling may be implemented more reasonably. Special interference and noise effects suffered by a UL subframe may be well compensated.

Based on the foregoing, it can be seen that, in the embodiments of the present invention, by resetting a corresponding relationship of a power controlling instruction for the PUSCH/PUCCH in a UL subframe, alternatively, by increasing number of bits in a power controlling field of a scheduling instruction in the multi-subframe scheduling, and re-defining a corresponding relationship between a power controlling bit and the PUSCH/PUCCH in a UL subframe, it may be guaranteed that the PUSCH and PUCCH of any UL subframe may have a corresponding power controlling instruction. Subsequently, the effective controlling of transmitting power of UL PUSCH and PUCCH of a UE may be implemented.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for transmitting data in a wireless communication system, comprising:
   receiving, by a user equipment (UE), uplink (UL) scheduling information for scheduling a plurality of UL subframes and downlink control information (DCI) in a downlink (DL) subframe, wherein the UL scheduling information or the DCI comprises power control information for at least one UL channel;
   determining, by the UE, if a UL channel among the at least one UL channel is for a first UL subframe that is first scheduled by the UL scheduling information, first transmission power for the UL channel of the first UL subframe based on transmission power for the UL channel of a previous UL subframe to the first UL subframe, and the power control information in the UL scheduling information or the DCI;
   determining, by the UE, if the UL channel is for a second UL subframe that is different from the first UL subframe and is scheduled by the UL scheduling information, second transmission power for the UL channel of the second UL subframe such that the second transmission power is identical to transmission power for the UL channel of a previous UL subframe of the second UL subframe; and
   transmitting, by the UE, uplink data based on the determined first transmission power or the determined second transmission power.

2. The method according to claim 1,
   wherein the power control information comprises power control information for the UL channel of each UL subframe scheduled by the UL scheduling information, and
   wherein transmission power for the UL channel of a certain UL subframe among the plurality of UL subframes is determined, based on transmission power for the UL channel of a previous UL subframe of the certain UL subframe and the power control information for the UL channel of the certain UL subframe.

3. The method according to claim 2,
   wherein if a certain UL subframe among the plurality of UL subframes is scheduled by a plurality of UL scheduling information received in a plurality of DL subframes, transmission power for the UL channel of the certain UL subframe, is determined, based on the power control information within latest received UL scheduling information.

4. The method according to claim 1, wherein the UL channel comprises a physical uplink shared channel (PUSCH).

5. A user equipment (UE), for transmitting data in a wireless communication system, comprising:
   a receiver that receives uplink (UL) scheduling information for scheduling a plurality of UL subframes and downlink control information (DCI) in a downlink (DL) subframe, wherein the UL scheduling information or the DCI comprises power control information for at least one UL channel;
   a controller that determines, if a UL channel among the at least one UL channel is for a first UL subframe that is first scheduled by the UL scheduling information, first transmission power for the UL channel of the first UL subframe based on transmission power for the UL channel of a previous UL subframe to the first UL subframe and the power control information in the UL scheduling information or the DCI, and determines, if the UL channel is for a second UL subframe that is different from the first UL subframe and is scheduled by the UL scheduling information, second transmission power for the UL channel of the second UL subframe such that the second transmission power is identical to transmission power for the UL channel of a previous UL subframe of the second UL subframe; and
   a transmitter that transmits uplink data based on the determined first transmission power or the determined second transmission power.

6. The UE according to claim 5,
   wherein the power control information comprises power control information for the UL channel of each UL subframe scheduled by the UL scheduling information, and
   wherein transmission power for the UL channel of a certain UL subframe among the plurality of UL subframes is determined, based on transmission power for the UL channel of a previous UL subframe of the certain UL subframe and the power control information for the UL channel of the certain UL subframe.

7. The UE according to claim 6,
   wherein if a certain UL subframe is scheduled by a plurality of UL scheduling information received in a plurality of DL subframes, the transmission power is determined, for the UL channel of the certain UL subframe, based on the power control information within latest received UL scheduling information.

8. The UE according to claim 5, wherein the UL channel comprises a physical uplink shared channel (PUSCH).

* * * * *